(12) United States Patent
Goffredo et al.

(10) Patent No.: US 7,510,066 B2
(45) Date of Patent: Mar. 31, 2009

(54) CASE FLOW ROLLER BED SYSTEM

(75) Inventors: John D. Goffredo, Roseto, PA (US); Dennis Mead, Swanzey, NH (US)

(73) Assignee: Frazier Industrial Company, Long Valley, NJ (US)

( * ) Notice: Subject to any disclaimer, the term of this patent is extended or adjusted under 35 U.S.C. 154(b) by 255 days.

(21) Appl. No.: 11/433,687

(22) Filed: May 12, 2006

(65) Prior Publication Data
US 2007/0261934 A1    Nov. 15, 2007

(51) Int. Cl.
*B65G 13/00* (2006.01)
(52) U.S. Cl. .................................................... 193/35 A
(58) Field of Classification Search .............. 198/343.1, 198/343.2, 35 A; 414/276
See application file for complete search history.

(56) References Cited

U.S. PATENT DOCUMENTS 2,463,532 A * 3/1949 Griffith ..................... 193/35 A
3,216,547 A * 11/1965 De Good et al. .............. 193/32
3,610,445 A * 10/1971 Kitchen et al. .............. 414/276
4,837,904 A * 6/1989 Abe et al. .................... 29/34 R
6,073,743 A * 6/2000 Mefford .................... 193/35 R
6,202,821 B1 * 3/2001 Crockett ................... 193/35 G

* cited by examiner

*Primary Examiner*—Yolanda Cumbess
(74) *Attorney, Agent, or Firm*—Dilworth & Barrese, LLP

(57) ABSTRACT

A case flow system includes a case flow roller bed having a proximal portion having a front end, a plurality of laterally extending axles disposed parallel to said front end and longitudinally spaced apart from each other, and a plurality of wheels disposed in a spaced-apart pattern along each of said axles, a distal portion having a rear end, and a movable stop member positioned between the proximal portion and distal portion of the case flow roller bed; at least one lower bar extending laterally and at least partially across the front end of the proximal portion of the case flow roller bed; and a fixed upper bar extending laterally across the front end of the proximal portion of the case flow roller bed, the fixed bar being vertically spaced apart from and above the lower bar so as to define a gap therebetween.

22 Claims, 9 Drawing Sheets

CASE FLOW ROLLER BED SYSTEM

BACKGROUND

1. Field of the Invention

The present invention is directed to a case flow system which is especially useful for managing inventory in a warehouse.

2. Background of the Art

Case flow systems are typically employed by distributors in warehouses for managing the inflow and outflow of cases of merchandise, or inventory, from manufacturers to retailers. The distributors temporarily store the variety of goods received from the manufacturer, and ship selected goods to the retailers in accordance with demand as determined by the consumer purchases.

Case flow structures are equipped with a roller bed including a plurality of wheels mounted to steel axles joined to a pair of side rails. Case flow roller beds are typically inclined. Thus, the cases, or cartons, of merchandise are loaded onto the rear of the roller bed and are allowed to "flow" towards the front under the force of gravity. The cases are manually retrieved from the front of the case flow roller bed.

U.S. Pat. No. 6,073,743 to Mefford discloses a case flow system comprising a roller bed equipped with a plurality of independent wheels disposed in a spaced apart relationship along a set of steel axles joined to a pair of side rails. A plurality of inverted generally U-shaped support members extend from the rear to the front of each bed and are located adjacent the wheels. The support members rest upon, and transfer the load to, cross beams disposed underneath the support members, which reduces the load on the axles.

SUMMARY

A case flow system is provided herein. The case flow system comprises (a) a case flow roller bed having a proximal portion having a front end and means for supporting and permitting sliding movement of a plurality of inventory cases, a distal portion having a rear end, and a movable stop member positioned between the proximal portion and distal portion of the case flow roller bed; (b) at least one lower bar extending laterally and at least partially across the front end of the proximal portion of the case flow roller bed; and (c) case abutment means extending laterally across the front end of the proximal portion of the case flow roller bed, the case abutment means being vertically spaced apart from and above the lower bar so as to define a gap therebetween.

The case flow system of the invention advantageously facilitates the management of inventory in a warehouse.

BRIEF DESCRIPTION OF THE DRAWINGS

Various embodiments are described below with reference to the drawings wherein.

DETAILED DESCRIPTION OF PREFERRED EMBODIMENT(S)

Figure 1:
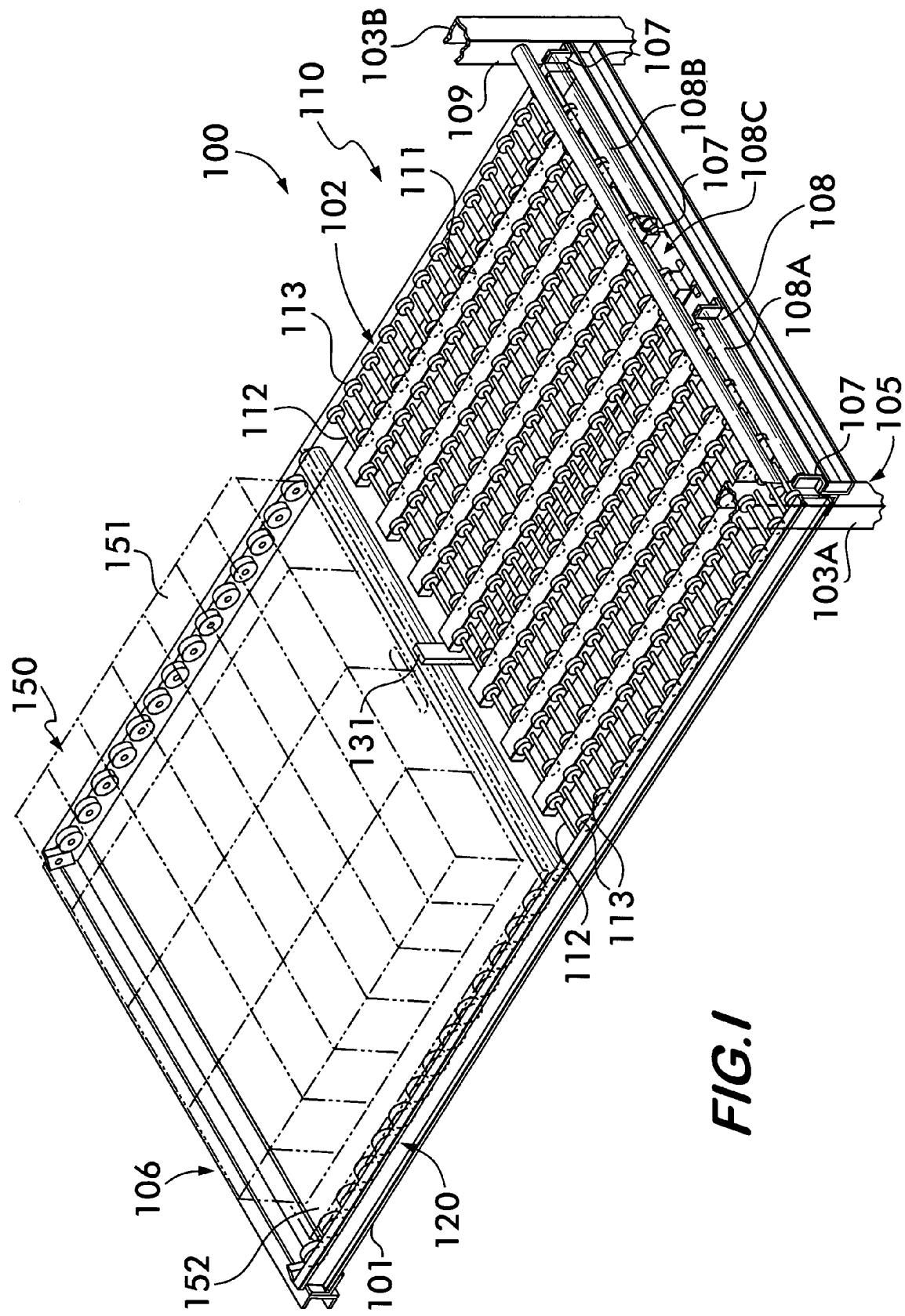
FIG. 1 is a perspective view of the case flow system of the invention.

The terms "merchandise" and "inventory" are used interchangeably in the present application. Also, the terms "cases" and "cartons" are used interchangeably. Like numerals in the drawing denote like features.

The flow system described herein facilitates the management of warehouse inventory. Typically, the inventory is boxed in cases and temporarily stored on pallets to provide pallet-supported inventory units which are transportable by, for example, forklift trucks or other movers.

Figure 2:
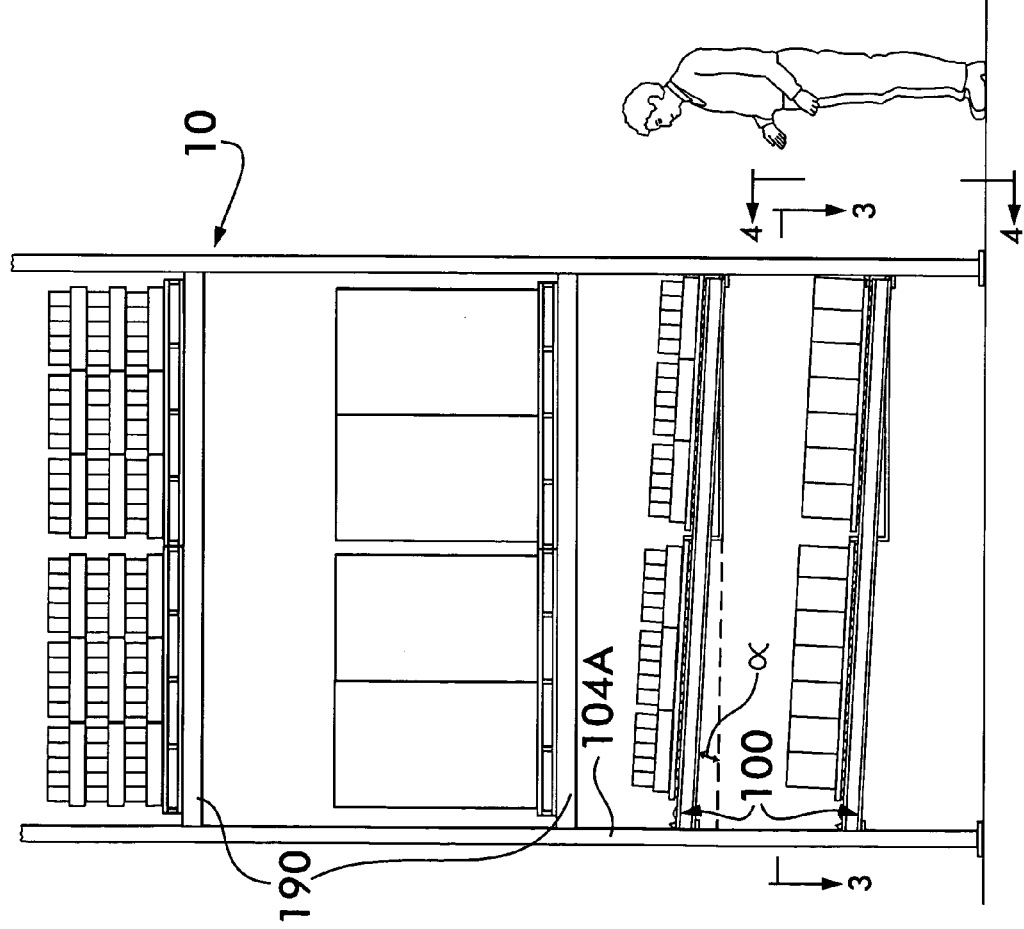
FIG. 2 is a side elevational view of the case flow system.
Figure 3:
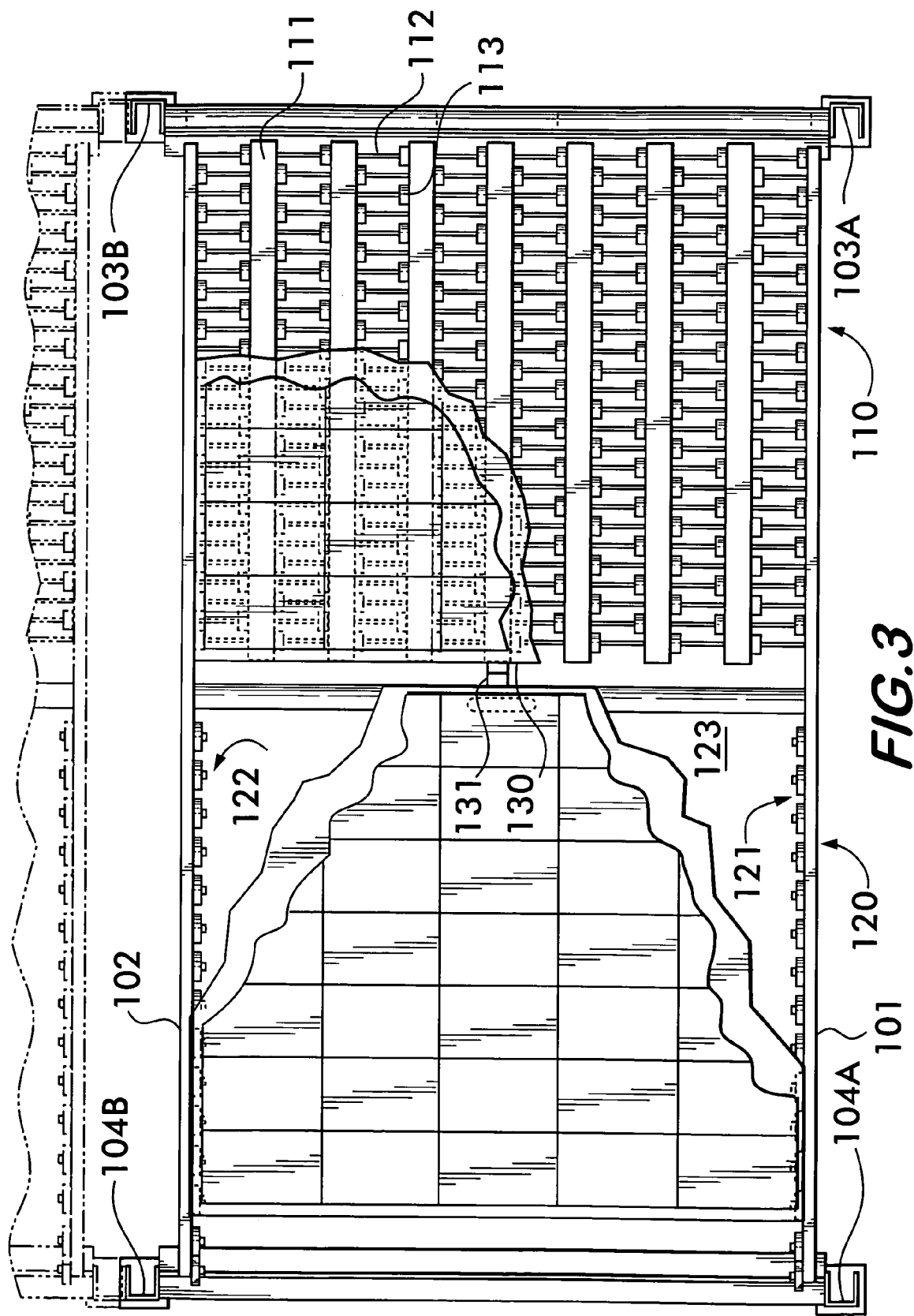
FIG. 3 is a plan view of the case flow system.

Referring now to FIGS. 1, 2 and 3 of the drawings, case flow system 10 includes at least one case flow roller bed 100 including first and second side beams 101 and 102 affixed to, and extending between, proximal cross beam 105 and distal cross beam 106. The case flow roller bed is supported by vertical proximal beams 103A and 103B, and vertical distal proximal beams 104A and 104B (FIG. 3). As shown in FIG. 2, two or more case flow roller beds 100, as well as storage shelves 190, can be constructed within a case flow system 10, and mounted in a vertically spaced-apart configuration. The case flow roller beds 100 are preferably mounted at a height convenient for manual loading or unloading of cases. A typical height off the ground for positioning the case flow roller bed 100 can range from 2 feet to 5 feet, although heights outside of this range can be used when appropriate. As explained more fully below, the case flow roller beds and/or storage shelves can be loaded and unloaded with pallet-supported inventory units by means of forklift trucks or other conventionally used machinery. The case flow roller bed 100 can be of any dimensions suitable for accommodating pallet-supported inventory units.

The case flow roller bed 100 includes a proximal portion 110 and a distal portion 120 horizontally spaced apart from each other. Proximal portion 110 includes means for directly supporting a plurality of inventory cases in such a manner as to permit sliding movement of the cases along the proximal portion. Any suitable meals for supporting and permitting sliding movement of the plurality of inventory cases can be employed such as ball bearings, friction-reduced surfaces, compressed air cushions, and the like.

In a preferred embodiment the means for supporting the inventory cases includes laterally extending axles 112 extending between side beams 101 and 102 which are preferably supported by a plurality of longitudinally extending and laterally spaced-apart support members 111. A plurality of roller wheels 113 are rotatably mounted to axles 112 and are adapted to support a pallet-supported inventory unit while allowing sliding motion, or "flow" of the pallet-supported inventory unit or individual inventory cases over the case flow roller bed 100. The support members 111 are inverted, preferably U-shaped members fabricated from metal or engineering plastic of sufficient strength. Preferred support members 111 for use in the present invention are disclosed and described in U.S. Pat. No. 6,073,743 to Mefford, which is herein incorporated by reference in its entirety.

Typically, an individual roller wheel 113 is positioned on a respective axle 112 between adjacent support members 111, and between a support member 111 and a respective one of the first and second side beams 101 and 102, as shown in FIGS. 1 and 3, for example. Optionally, spacers (not shown) can be mounted to the axles, each spacer being positioned between a roller wheel 113 and one of the support members 111 or one of the first and second side beams 101 and 102, so as to prevent the roller wheels 113 from sliding laterally along the axles 112. Spacers are illustrated and described in U.S. Pat. No. 6,073,743.

The distal portion 120 of the case flow roller bed is spaced apart form the proximal portion 110. Distal portion 120 includes a plurality of roller wheels 121 each rotatably mounted to respective axles fixed to side beam 101 and a plurality of roller wheels 122 each rotatably mounted to respective axles fixed to side beam 102. The space 123 between the roller wheels 121 and roller wheels 122 is preferably void. The distal portion 120 does not need to have the structure of support members and laterally extending axles as in the proximal portion 110 because it does not require support for individual cases, as explained below.

Figure 5:
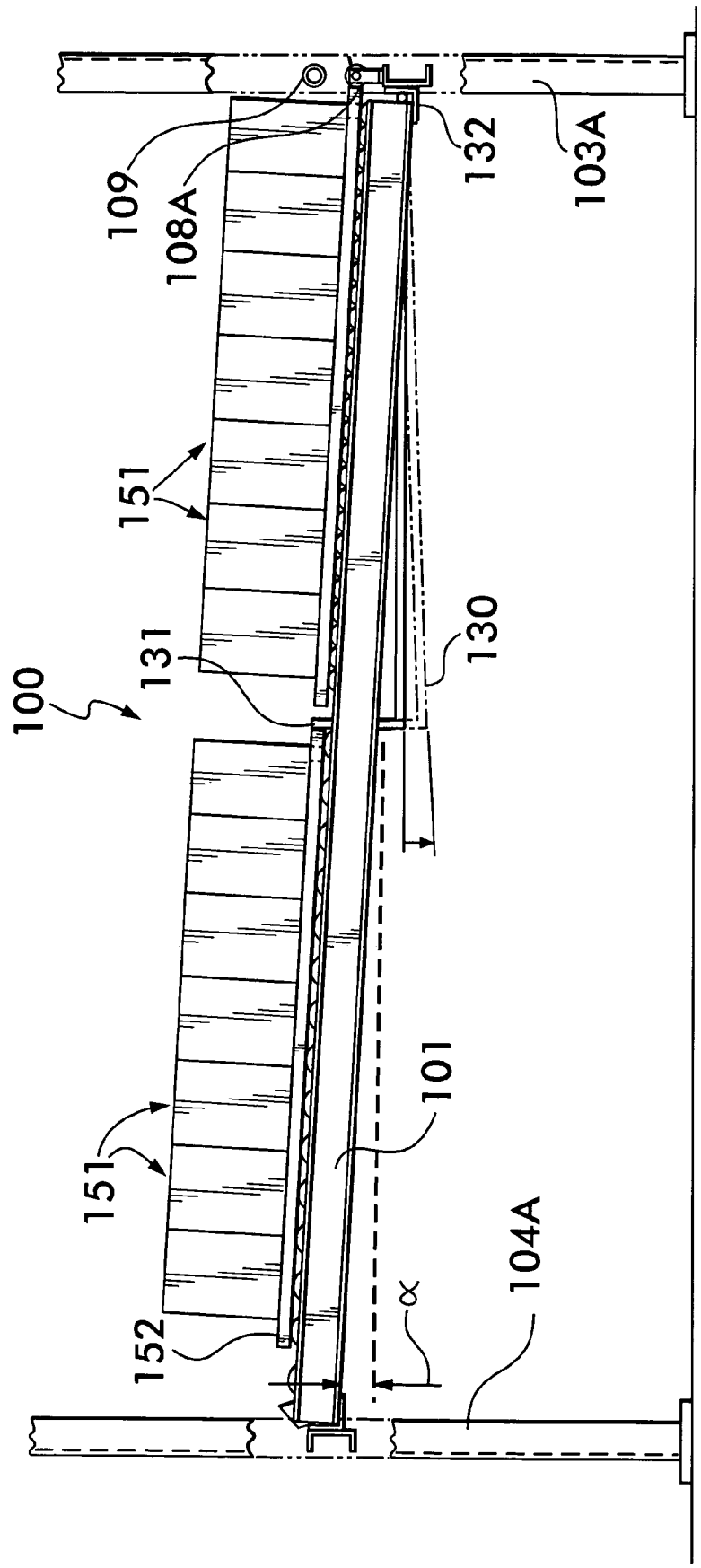
FIGS. 5 to 9 are side elevational views of the case flow system sequentially illustrating the management of warehouse inventory using the case flow system of the invention.

Referring also now to FIG. 5, as a gate mechanism 130 is movably mounted to the case flow bed to control the movement of pallet-supported inventory units from the distal portion 110 of the case flow roller bed 100. In an embodiment of the invention gate 130 is hingedly mounted at end 132 to the proximal end 105 of the case flow bed. Gate 130 includes a stop member 131 positioned between the proximal portion 110 and the distal portion 120 of the case flow roller bed. The stop member 131 is movable between a first position wherein the stop member 131 blocks a pallet-supported inventory unit positioned on distal portion 120 from moving to the proximal portion 110, and a second position wherein the stop member 131 permits the pallet-supported inventory unit to slide from the distal portion 120 to the proximal portion 110. In a preferred embodiment of the invention the stop member 131 is a bar which, in the first position, extends vertically to a sufficient distance so as to present a distally facing stop surface against which the leading proximal end 152A of a pallet abuts. The pallet 152 is thereby prevented from moving proximally any further. In the second position the bar is lowered to such a degree that the distal face of the stop member 131 is no longer aligned with, and in the path of, the pallet, as explained more fully below. In a preferred embodiment, the gate 130 is biased by a spring or counterweight to maintain the stop member 131 in the first portion unless manually moved to the second portion.

Figure 6:
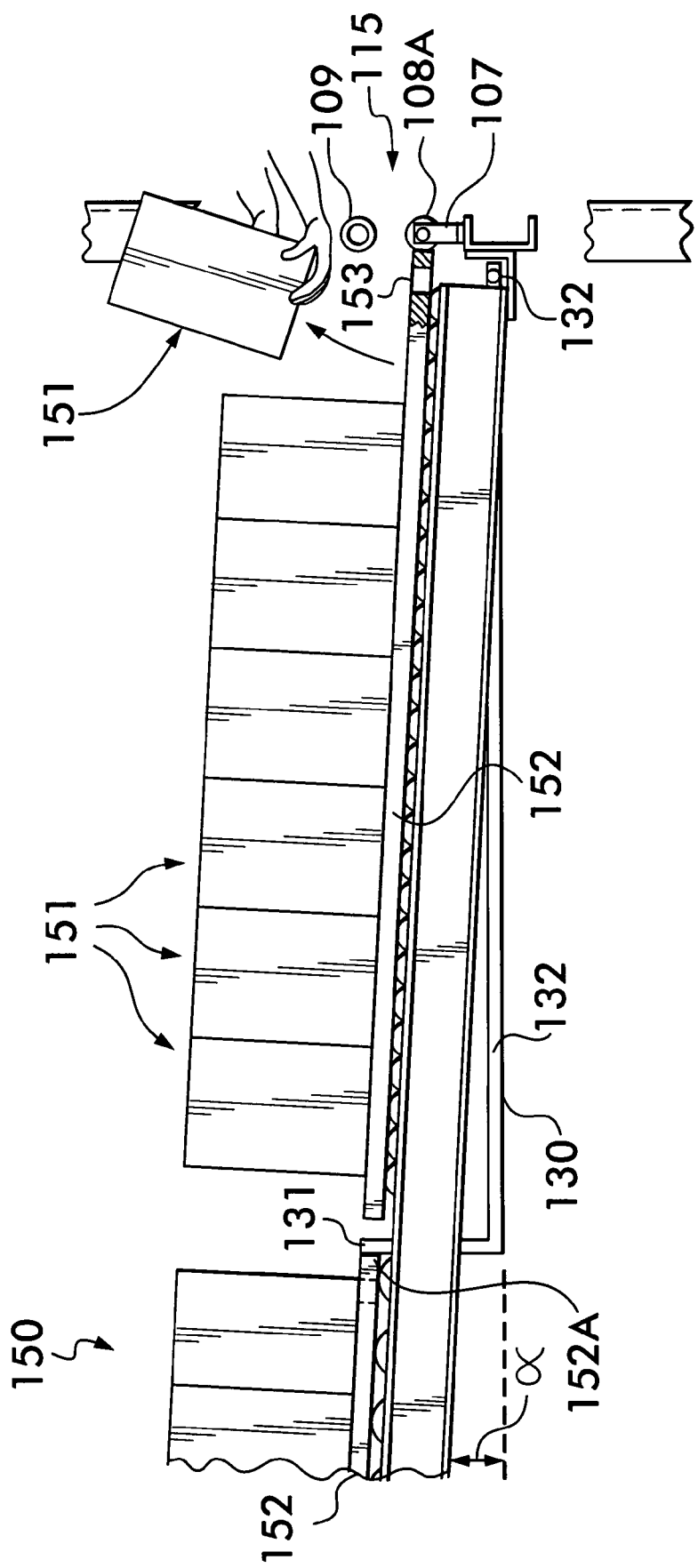

Referring now to FIGS. 5 and 6, the case flow roller bed 100 is preferably inclined at an angle a ranging from about 2 degrees to about 10 degrees, although inclinations at angles outside of this range are also considered to be within the scope of this invention and can be used where appropriate. The inclination of the case flow roller bed 100 permits pallet-supported inventory units and/or individual cases to slide proximally over the case flow roller bed under the force of gravity.

Figure 4:
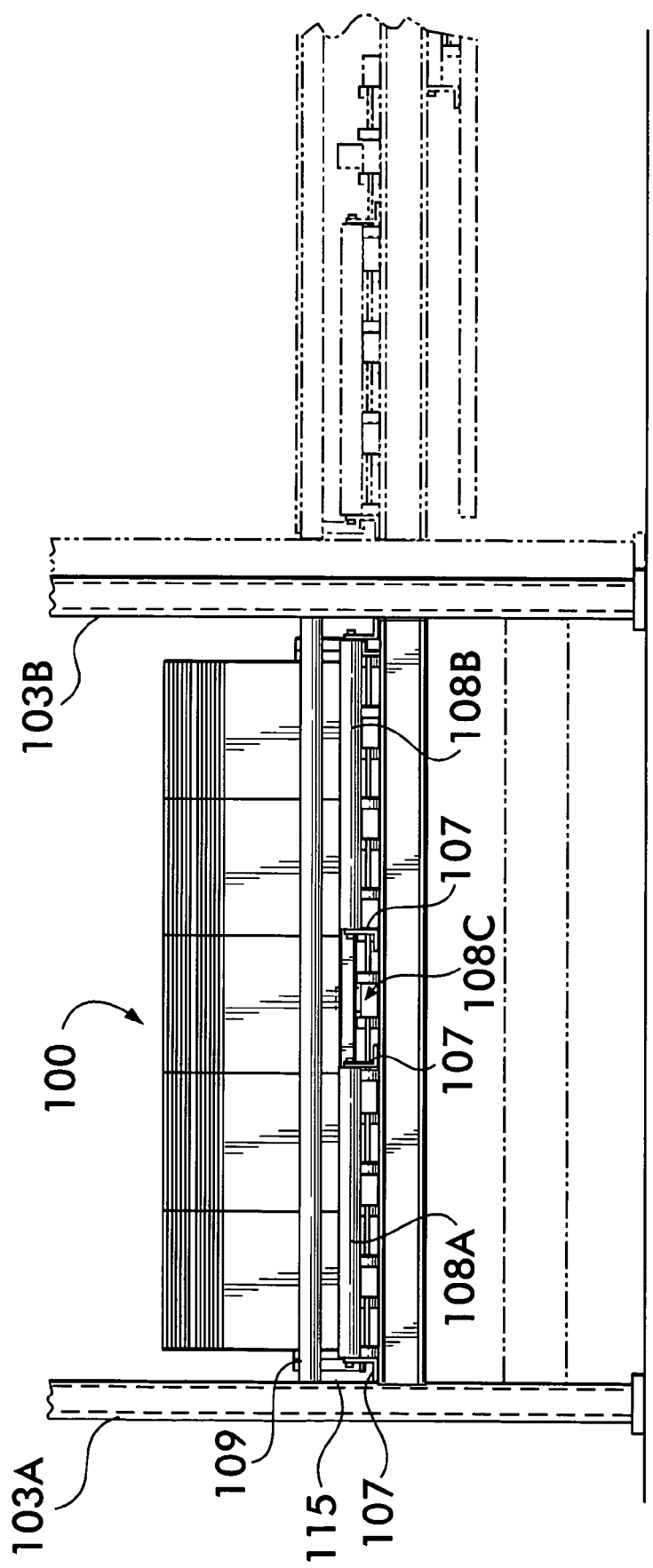
FIG. 4 is a front elevational view of the case flow system

Referring to FIG. 1, the case flow system 10 further includes at least one laterally oriented pallet support bar 108 positioned at a height so as to abut the leading proximal edge 152A (FIG. 6) of a pallet, thereby preventing any further proximal movement of the pallet. The pallet support bar 108 is preferably a rotatably mounted roller bar to facilitate removal of the pallet as described below. Pallet support bar 108 is preferably rotatably mounted to, and extending horizontally between, mounting brackets 107 at the proximal end of the case flow roller bed 100. Preferably, as shown in FIGS. 1 and 4, two rotatable pallet support bars 108A and 108B are mounted colinearly and spaced-apart from each other so as to leave a gap 108C therebetween. The gap 108C permits a worker to manually reach the band grip of a pallet as described below.

A horizontal, laterally extending fixed bar 109 is mounted at each end to a respective one of proximal beams 103A and 103B.

The fixed bar 109 serves as a case abutment means as described below and is positioned above the pallet support bar 108 so as to leave a vertical gap 115 therebetween (FIGS. 4 and 6), gap 115 being of sufficient magnitude so as to permit the passage therethrough of the pallet 152.

Figure 7:
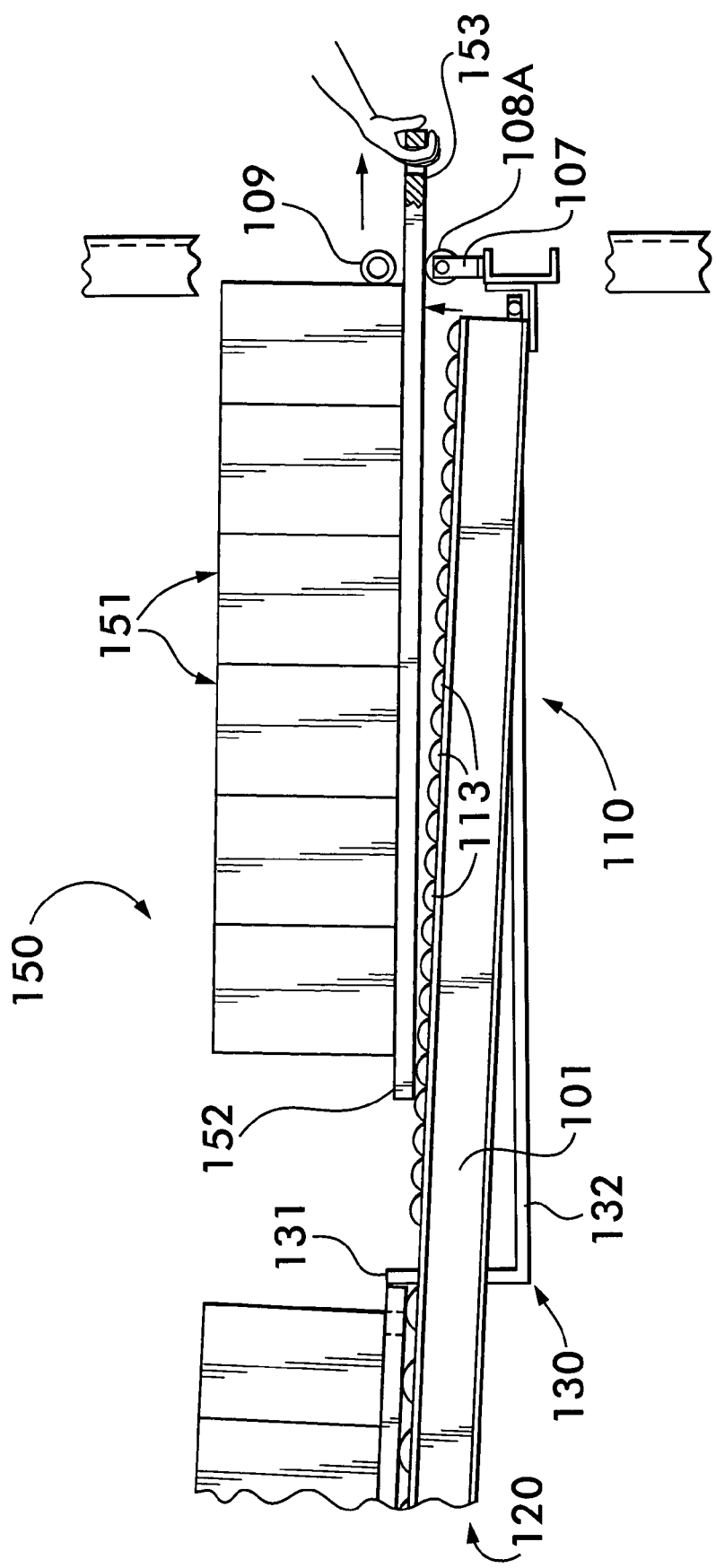

Referring now to FIGS. 6 and 7, a pallet-supported inventory unit 150 of merchandise includes a plurality of cases 151 supported on pallet 152. The pallet 152 includes a hand grip 153 at the proximal leading edge 152A of the pallet to facilitate grasping and lifting of the pallet 152 for its removal from the case flow roller bed. The hand grip 153 is preferably positioned to be in alignment with the gap 108C between the pallet support bars 108A and 108B.

In a preferred method of inventory management, a first pallet-supported inventory unit 150 of merchandise is loaded by forklift or other means onto the distal portion 120 of the case flow roller bed oriented such that the leading edge 152A of the pallet 152 having the hand grip 153 faces proximally. Gate 130 is set such that the vertical stop bar 131 is in the non-blocking second position and does not block the pallet 152, and the first pallet-supported inventory unit 150 of merchandise is permitted to flow to the proximal portion 110 of the case flow roller bed, where it is stopped by pallet support bar 108 (or bars 108A and 108B)

Figure 8:
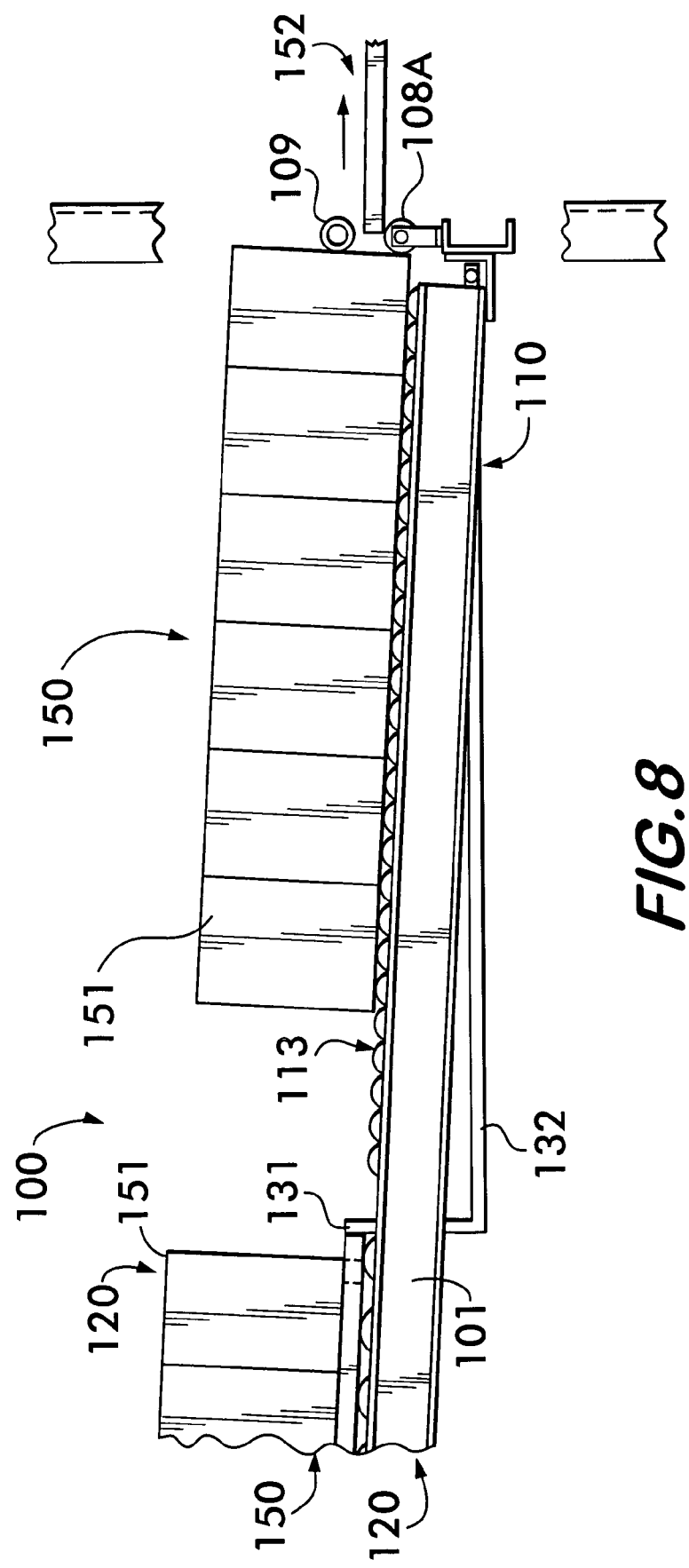

Gate 130 is set then positioned so that vertical stop bar 131 is moved to the blocking first position. A second pallet-supported inventory unit of merchandise 150 can then be loaded onto the distal portion 120 of the case flow roller bed, but it will remain there until released by gate 130. As shown in FIG. 6, a proximal case 151 is manually removed from the pallet 152 to uncover the hand grip 153. As shown in FIG. 7, the worker manually grasps the hand grip 153 of the pallet (e.g., through gap 108C), lifts the proximal end of the pallet 152 and pulls the pallet 152 through gap 115 between the pallet support bar 108 and the horizontal fixed bar 109. As the pallet 152 is pulled proximally, the fixed bar 109 abuts the proximal row of cases 151 and prevents any further proximal movement of the cases. As shown in FIG. 8, when the pallet 152 is removed, the cases 151 drop down onto the roller wheels 113 of the proximal portion 110 of the case flow roller bed. This arrangement then facilitates manual selection and proximal removal of individual cases by a worker.

Figure 9:
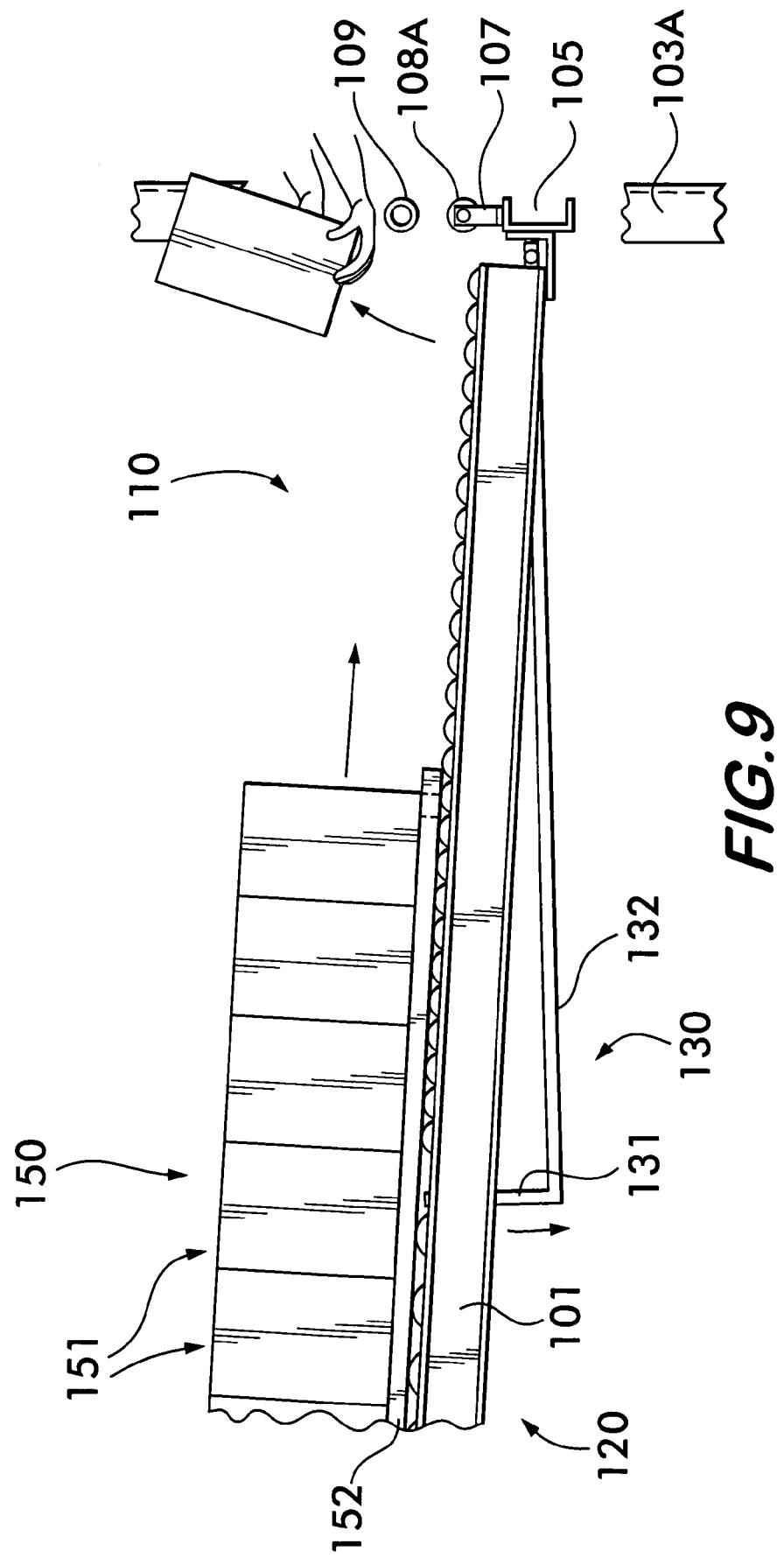

Referring now to FIG. 9, when all of the cases 151 have been removed from the proximal portion 110 of the case flow roller bed, the gate 130 is moved such that the vertical stop bar 131 is moved to the second, non-blocking, position, and no longer blocks the free flow of the second pallet-supported inventory unit from the distal portion 120 of the case flow roller bed to the proximal portion 110. The vertical stop bar 131 is thereafter raised to the first stop position and another pallet-supported inventory unit is loaded onto the distal portion 120 of the case flow roller bed. The process is then repeated.

Unlike previous systems which require manual loading of individual cases onto the case flow roller bed, the system of the present invention more efficiently permits loading of entire pallet-supported inventory units while permitting manual selection and removal of individual cases.

Because the pallet is not removed in the distal portion 120 of the case flow roller bed, the distal portion 120 needs to directly support only the pallet 152, not individual cases 151. This can be achieved with the two sets of aligned rollers 121 and 122, provided that the pallet 152 is of such width as to be contacted and supported by both sets of roller wheels 121 and 122. Savings are thus achieved because the distal portion 120 does not require the plurality of axles 112 and roller wheels 113 as in the proximal portion 110, which supports the individual cases.

The system of the invention is also advantageously suited for automated handling of merchandise. For example machine readable identifiers such as bar codes can be used to mark individual case flow roller beds for storage of preselected merchandise. Loading can then be performed by automated equipment controlled by computers.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A case flow system comprising:
   a) a case flow roller bed having
      a proximal portion having a front end and means for supporting and permitting sliding movement of a plurality of inventory cases,
      a distal portion having a rear end, and
      a movable stop member positioned between the proximal portion and distal portion of the case flow roller bed;
   b) at least one lower bar extending laterally and at least partially across the front end of the proximal portion of the case flow roller bed; and,
   c) case abutment means extending laterally across the front end of the proximal portion of the case flow roller bed, the case abutment means being vertically spaced apart from and above the at least one lower bar so as to define a gap therebetween.

2. The system of claim 1 wherein the means for supporting and permitting sliding movement of a plurality of inventory cases comprises a plurality of laterally extending axles disposed parallel to said front end and longitudinally spaced apart from each other, and a plurality of wheels rotatably mounted to and disposed in a spaced-apart pattern along said axles.

3. The system of claim 1 wherein the case flow roller bed is inclined to permit movement by gravity of a pallet-supported inventory unit loaded onto the distal portion of the case flow roller bed onto the proximal portion of the case flow roller bed.

4. The system of claim 3 wherein the stop member is movable between a first position for preventing the movement of the pallet-supported inventory unit from the distal portion of the case flow roller bed to the proximal portion of the case flow roller bed, and a second position permitting said movement.

5. The system of claim 1 wherein the at least one lower bar is positioned at a height above the case flow roller bed so as to abut a front edge of a pallet supported on the proximal portion of the case flow roller bed.

6. The system of claim 5 wherein the case abutment means comprises a fixed upper bar and the gap between the fixed upper bar and the at least one lower bar is of such dimension so as to permit the pallet to pass therethrough.

7. The system of claim 3 wherein the case flow roller bed is inclined at an angle of from about 2 degrees to about 10 degrees.

8. The system of claim 1 further comprising at least two case flow roller beds mounted to a frame in a vertical spaced apart relationship.

9. The system of claim 2 wherein the proximal portion of the case flow roller bed further includes a plurality of support members oriented longitudinally and laterally spaced apart from each other, the axles being disposed through and at least partially supported by the support members.

10. A case flow system comprising:
    a) a case flow roller bed having
       a proximal portion having a front end and means for supporting and permitting sliding movement of a plurality of inventory cases,
       a distal portion having a rear end, and
       a movable stop member positioned between the proximal portion and distal portion of the case flow roller bed;
    b) at least one lower bar extending laterally and at least partially across the front end of the proximal portion of the case flow roller bed; and,
    c) case abutment means extending laterally across the front end of the proximal portion of the case flow roller bed, the case abutment means being vertically spaced apart from and above the at least one lower bar so as to define a gap therebetween,
    wherein the distal portion of the case flow roller bed includes no more than two rows of wheels rotatably mounted to side rails to support and permit sliding movement of the pallet-supported inventory unit wherein said two rows of wheels extend lengthwise in the direction of travel of the inventory and wherein one row is mounted to one of the side rails and the other row is mounted to the other side rail.

11. A case flow system comprising:
    a) a case flow roller bed having
       a proximal portion having a front end and means for supporting and permitting sliding movement of a plurality of inventory cases,
       a distal portion having a rear end, and
       a movable stop member positioned between the proximal portion and distal portion of the case flow roller bed;
    b) at least one lower bar extending laterally and at least partially across the front end of the proximal portion of the case flow roller bed; and,
    c) case abutment means extending laterally across the front end of the proximal portion or the case flow roller bed, the case abutment means being vertically spaced apart from and above the at least one lower bar so as to define a gap therebetween,
    wherein the at least one lower bar comprises at least two rotatably mounted bars laterally spaced apart from and coaxially aligned with each other so as to define a gap therebetween.

12. A method for handling warehouse inventory comprising:
    a) loading a pallet-supported inventory unit onto a distal portion of a case flow roller bed, said pallet-supported inventory unit including inventory supported on a pallet;
    b) permitting the pallet-supported inventory unit to slide to a proximal portion of the case flow roller bed; and,
    c) removing the pallet from under the inventory at a proximal end of the case flow roller bed,
    wherein the case flow roller bed includes at least one lower bar extending laterally across the proximal end of the case flow roller bed at a front end thereof and a fixed bar extending laterally across the front end of the case flow roller bed, the fixed bar being vertically spaced apart from and above the lower bar so as to define a gap therebetween, and step (c) comprises proximally moving the pallet through said gap.

13. The method of claim 12 wherein the case flow roller bed includes a stop member positioned between the distal portion and the proximal portion of the case flow roller bed, the stop member being movable between a first position wherein the stop member prevents the pallet-supported inventory unit from moving from the distal portion of the case flow roller bed to the proximal portion of the case flow roller bed and a second position wherein the stop member does not prevent the pallet-supported inventory unit from moving from the distal portion of the case flow roller bed to the proximal portion of the case flow roller bed, and step (b) comprises moving the stop member from the first position to the second position.

14. A method for handling warehouse inventory comprising:
   a) providing at least one case flow system including
      i) a case flow roller bed having
         a proximal portion having a front end and roller means for supporting and permitting sliding movement of a plurality of inventory cases,
         a distal portion having a rear end, and
         a movable stop member positioned between the proximal portion and distal portion of the case flow roller bed;
      ii) at least one lower bar extending laterally across the front end of the proximal portion of the case flow roller bed; and,
      iii) case abutment means extending laterally across the front end of the proximal portion of the case flow roller bed, the case abutment means being vertically spaced apart from and above the lower bar so as to define a gap therebetween;
   b) loading a first pallet-supported inventory unit onto the distal portion of the case flow roller bed, said first pallet-supported inventory unit including multiple cases of inventory supported on a pallet having a hand grip portion;
   c) permitting said first pallet-supported inventory unit to slide to said proximal portion of the case flow roller bed; and,
   d) removing the pallet from the case flow roller bed from under the inventory cases thereby permitting the remaining cases of inventory to rest upon the roller means of the proximal portion of the case flow roller bed.

15. The method of claim 14 wherein the means for supporting and permitting sliding movement of a plurality of inventory cases comprises a plurality of laterally extending axles disposed parallel to said front end and longitudinally spaced apart from each other, and a plurality of wheels rotatably mounted to and disposed in a spaced-apart pattern along said axles.

16. The method of claim 14 wherein the stop member is movable between a first position wherein the stop member prevents the pallet-supported inventory unit from moving from the distal portion of the case flow roller bed to the proximal portion of the case flow roller bed and a second position wherein the stop member does not prevent the pallet-supported inventory unit from moving from the distal portion of the case flow roller bed to the proximal portion of the case flow roller bed, and step (c) comprises moving the stop member to the second position.

17. The method of claim 16 wherein the case flow roller bed is inclined and the pallet-supported inventory unit is moved by gravity from the distal portion of the case flow roller bed to the proximal portion of the case flow roller bed.

18. The method of claim 14 further comprising removing one or more inventory cases from a proximal portion of the pallet-supported inventory unit to expose the hand grip portion.

19. The method of claim 18 further including the steps of:
   moving the stop member from the second position to the first position, and
   loading a subsequent pallet-supported inventory unit onto the distal portion of the case flow roller bed.

20. The method of claim 19 further comprising the step of removing the inventory from the proximal portion of the case flow roller bed and thereafter permitting the subsequent pallet-supported inventory unit to move from the distal portion of the case flow roller bed to the proximal portion of the case flow roller bed.

21. The method of claim 14 wherein multiple case flow roller beds are provided, and each case flow roller bed is marked with a machine readable identifier.

22. The method of claim 21 further comprising the step of selecting a particular case flow roller bed for the handling of a particular type of inventory and loading said particular type of inventory onto the selected case flow roller bed.

* * * * *